US010567441B2

United States Patent
Nainar et al.

(10) Patent No.: US 10,567,441 B2
(45) Date of Patent: Feb. 18, 2020

(54) DISTRIBUTED SECURITY SYSTEM

(71) Applicant: Cisco Technology, Inc., San Jose, CA (US)

(72) Inventors: Nagendra Kumar Nainar, Morrisville, NC (US); Rajiv Asati, Morrisville, NC (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 15/870,957

(22) Filed: Jan. 14, 2018

(65) Prior Publication Data

US 2019/0222612 A1 Jul. 18, 2019

(51) Int. Cl.
*H04L 29/06* (2006.01)
*H04L 29/12* (2006.01)

(52) U.S. Cl.
CPC ........ *H04L 63/205* (2013.01); *H04L 61/2592* (2013.01); *H04L 63/1425* (2013.01); *H04L 63/1458* (2013.01); *H04L 2212/00* (2013.01)

(58) Field of Classification Search
CPC ............... H04L 63/205; H04L 63/1458; H04L 61/2592; H04L 63/1425; H04L 2212/00; H04L 12/4633
See application file for complete search history.

(56) References Cited

U.S. PATENT DOCUMENTS

| 7,207,062 | B2* | 4/2007 | Brustoloni | H04L 29/06 370/229 |
| 7,379,423 | B1* | 5/2008 | Caves | H04L 63/1458 370/230 |
| 8,135,657 | B2 | 3/2012 | Kapoor et al. | |
| 9,077,611 | B2 | 7/2015 | Cordray et al. | |
| 9,609,018 | B2 | 3/2017 | Smith | |
| 9,781,603 | B1* | 10/2017 | Nenov | G06F 9/45533 |
| 2005/0100019 | A1* | 5/2005 | Sahita | H04L 63/0227 370/395.2 |

(Continued)

FOREIGN PATENT DOCUMENTS

CN 100370757 2/2008

OTHER PUBLICATIONS

Doron, E. et al; Distributed Denial-Of-Service Open Threat Signaling (DOTS) Telemetry Specifications; IETF, Oct. 2016.

*Primary Examiner* — Matthew Smithers

(57) ABSTRACT

In one embodiment, a system includes a first host computer including a host interface configured to receive traffic from a domain ingress node of a first domain, and processing machinery configured to instantiate worker nodes, instantiate a master node and a security gateway agent on the master node, instantiate a plurality of security clients on the worker nodes, wherein each worker node includes at least one security client, wherein each security client is configured to monitor at least part of the traffic being forwarded in the one worker node for malicious traffic, and report a first data item about the malicious traffic to the security gateway agent, and wherein the security gateway agent is configured to forward a second data item about the malicious traffic to a security server to determine at least one security policy to mitigate the malicious traffic, and to be enforced by a node.

20 Claims, 3 Drawing Sheets

(56) References Cited

U.S. PATENT DOCUMENTS

| | | | |
|---|---|---|---|
| 2006/0272018 A1* | 11/2006 | Fouant | H04L 63/1416 726/23 |
| 2008/0271146 A1* | 10/2008 | Rooney | H04L 63/1425 726/23 |
| 2009/0037977 A1* | 2/2009 | Gai | H04L 63/101 726/1 |
| 2018/0176139 A1* | 6/2018 | Mortensen | H04L 47/32 |
| 2019/0089677 A1* | 3/2019 | Ashley | H04L 63/0236 |
| 2019/0089678 A1* | 3/2019 | Lam | H04L 63/0245 |

* cited by examiner

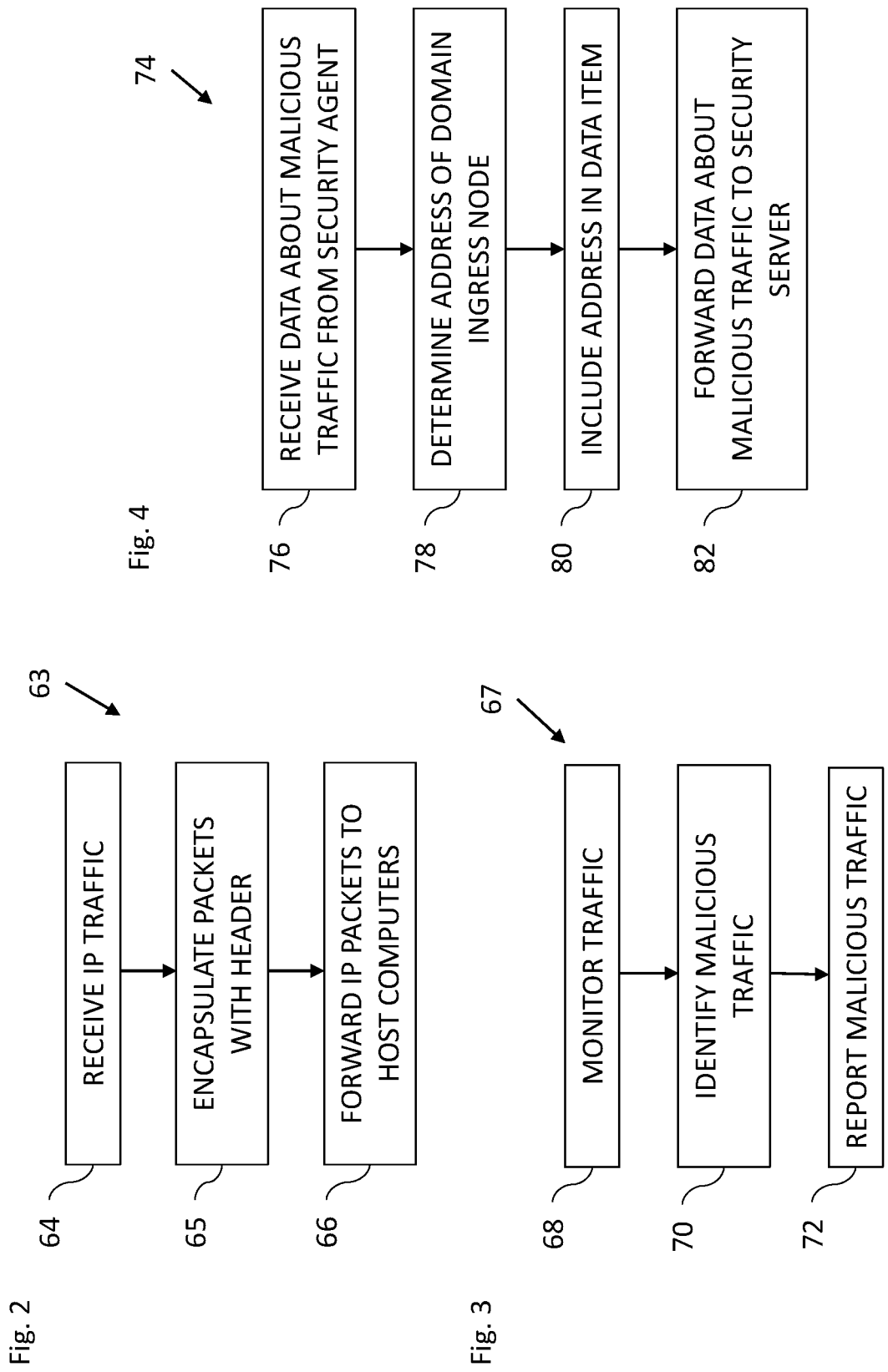

DISTRIBUTED SECURITY SYSTEM

TECHNICAL FIELD

The present disclosure generally relates to distributed security systems for a domain with one or more host computers.

BACKGROUND

One of the commonly deployed distributed denial of service (DDoS) mitigation mechanisms detects one or more malicious flows and diverts the malicious flow(s) towards a "sink/scrubber" for further processing. This mechanism generally works on a per attack basis and generally includes detecting a new attack vector, identifying the corresponding flows, sinking them, and identifying network ingress points to ensure such attack flows can be contained using a security policy.

The DDoS Open Threat Signaling (DOTS) standards, described in several Internet Engineering Task Force (IETF) papers, are being developed to address DDoS mitigation in a distributed security architecture, based on real-time signaling of DDoS related telemetry and threat handling requests and data between elements concerned with DDoS attack detection, classification, trace back, and mitigation. In accordance with DOTS, a DOTS client normally communicates with a DOTS server. The DOTS server computes relevant policies based on an attack and pushes the policies to the DOTS client or clients.

BRIEF DESCRIPTION OF THE DRAWINGS

The present disclosure will be understood and appreciated more fully from the following detailed description, taken in conjunction with the drawings in which:

FIG. 2 is a flow chart including exemplary steps in a first method of operation of a domain ingress node in the system of FIG. 1;

FIG. 3 is a flow chart including exemplary steps in a method of operation of a security client in the system of FIG. 1;

FIG. 4 is a flow chart including exemplary steps in a method of operation of a security gateway agent in the system of FIG. 1;

DESCRIPTION OF EXAMPLE EMBODIMENTS

Overview

Figure 1:
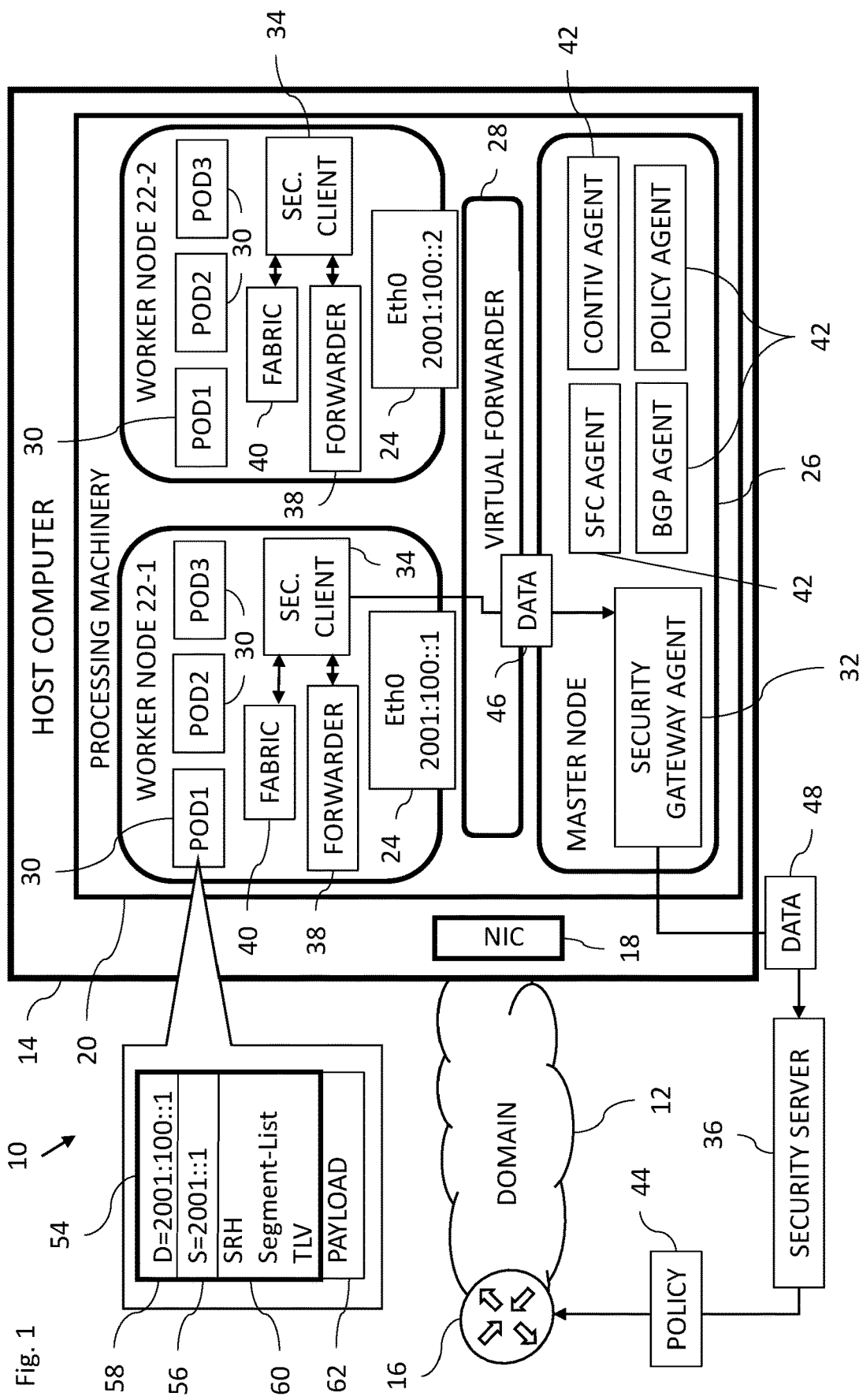
FIG. 1 is a block diagram view of a distributed security system constructed and operative in accordance with an embodiment of the present disclosure.

There is provided in accordance with an embodiment of the present disclosure, a system including a first host computer including a host interface configured to receive traffic from a first domain ingress node of a first domain, and processing machinery configured to instantiate a plurality of worker nodes, each one worker node of the plurality of worker nodes including a plurality of software applications, instantiate a master node and a security gateway agent on the master node, and instantiate a plurality of security clients on the plurality of worker nodes, wherein each one worker node of the plurality of worker nodes includes at least one security client of the plurality of security clients, wherein each one security client of the plurality of security clients is configured to monitor at least part of the traffic being forwarded in the one worker node in which the one security client is instantiated for malicious traffic, and report a first data item about the malicious traffic to the security gateway agent, and wherein the security gateway agent is configured to receive the first data item about the malicious traffic from the one security client and forward a second data item about the malicious traffic to a security server, external to the host, for the security server to determine at least one security policy, to mitigate the malicious traffic, and to be enforced by at least one domain ingress node external to the host computer and/or by a node external to the first domain.

There is also provided in accordance with another embodiment of the present disclosure, a domain ingress node device, including at least one first port interface configured to receive Internet Protocol (IP) traffic from sources external to a first domain, the IP traffic including a plurality of IP packets, a processor configured to encapsulate each one IP packet of the plurality of IP packets with an encapsulation header including a source address of the domain ingress node and a destination address of a destination of the one IP packet in the first domain, and at least one second port interface configured to forward the plurality of IP packets to a plurality of host computers in the first domain, wherein the processor is further configured to receive at least one security policy, from a security server external to the domain ingress node, to mitigate malicious traffic identified in at least one of the plurality of host computers, and enforce the at least one security policy for the IP traffic received by the at least one first port interface.

There is also provided in accordance with still another embodiment of the present disclosure, a security server device, including an interface configured to receive a data item about malicious traffic from a security gateway agent instantiated on a host computer of a first domain, a processor configured to compute at least one security policy to mitigate the malicious traffic, and send the at least one security policy to a domain ingress node external to the host computer, and/or by a node external to the first domain, to enforce the at least one security policy.

DETAILED DESCRIPTION

Reference is now made to FIG. 1, which is a block diagram view of a distributed security system 10 constructed and operative in accordance with an embodiment of the present disclosure. By way of introduction, applying the distributed denial of service (DDoS) Open Threat Signaling (DOTS) standard in a container architecture may be problematic, as forwarders and fabric are typically data plane based, whereas DOTS clients according to the DOTS standard have control plane functionality for reporting an attack and receiving policies among other functions. Also in a multi-tenant data center or in a container networking architecture (e.g., Kubernetes system (also known as KS8), or the Docker platform), a node, or cluster of containers (e.g., a pod), may be on a per-tenant basis instantiating end applications or services. If some of the tenants subscribe to a DDoS mitigation service, then the policy enforcement point would generally be on the node or pod where the tenant application instantiation has taken place, thereby rendering the rest of the data center and wide area network (WAN) still exposed to the attack traffic. In some implementations, identifying the DOTS clients by a DOTS server may be difficult to achieve. Additionally, implementing DOTS client policy enforcement per node or per pod may be too processor intensive.

The distributed security system 10 is configured to provide security within a domain 12, for example, but not limited to, a cloud domain or a data center, including a plurality of host computers 14. For the sake of simplicity, FIG. 1 shows one host computer 14. The distributed security system 10 provides traffic monitoring on the node level, or on the cluster of applications level (e.g., pod level), while enforcing security policies on one or more domain ingress nodes 16 (included in the distributed security system 10 but external to the host computers 14) to the domain 12 and/or on any suitable node (which may be disposed externally to the domain 12), as will now be described below in more detail. For the sake of simplicity, FIG. 1 shows one domain ingress node 16.

The host computer 14 includes a host interface 18, for example, but not limited to, a network interface card (MC). The host interface 18 is configured to receive traffic from the domain ingress node 16 of the domain 12 in which the host computer 14 is disposed. The host computer 14 also includes processing machinery 20 among other elements (not shown) for example, but not limited to, memory and data buses. The processing machinery 20 is configured to load and run software to instantiate a plurality of worker nodes 22, a master node 26, and a node virtual forwarder 28. FIG. 1 shows two worker nodes 22, worker node 22-1, and worker node 22-2. It will be appreciated that the host computer 14 may instantiate any number of worker nodes 22. The master node 26 may also be any suitable management mode performing node management tasks as known in the art. The node virtual forwarder 28 is configured to receive the traffic from the host interface 18 for forwarding to the worker nodes 22 and/or the master node 26. The node virtual forwarder 28 may be based on Vector Packet Processing (VPP) technology or Open vSwitch (OVS), by way of example only. Each worker node 22 includes a virtual interface 24 for receiving traffic from the node virtual forwarder 28, a node traffic forwarder 38 (e.g., an ingress or other software forwarder), a network fabric 40 (e.g., Contiv or OVS), and a plurality of software applications. The software applications may be containerized in a plurality of containers. Each container may include one or more software applications. The containers may be encapsulated in a plurality of Kubernetes pods, where each Kubernetes pod includes one or more containers. The containers may be encapsulated in any other suitable encapsulation, for example, in accordance with the Docker platform. The software applications may be clustered or non-clustered. The software applications may also be implemented without using a container architecture. FIG. 1 shows that each of the worker nodes 22 includes a plurality of pods 30. It will be appreciated that the pods 30 are shown by way of example only and that the disclosure is not limited to a Kubernetes implementation or even limited to a container architecture implementation as described above. The node virtual forwarder 28 of each worker node 22 has an associated Internet Protocol (IP) address. The IP address of worker node 22-1 is 2001:100::1. The IP address of worker node 22-1 is 2001:100::2.

The processing machinery 20 is configured to load and run software to instantiate a security gateway agent 32 on the master node 26. The security gateway agent 32 is described in more detail with reference to FIG. 4. The processing machinery 20 is configured to load and run software to instantiate other agents 42 on the master node 26, for example, but not limited to, a Contiv agent, a policy agent, a service function chaining (SFC) agent, and a border gateway protocol (BGP) agent or any suitable agent. The policy agent may be instructed by the security gateway agent 32 to enforce a node-to-node traffic policy (regarding traffic flow between the worker nodes 22) on the node virtual forwarder 28.

The processing machinery 20 is configured to load and run software to instantiate a plurality of security clients 34 on the worker nodes 22. The instantiation of the security clients 34 may be performed by the security gateway agent 32. Each worker node 22 includes one or more security clients 34, for example, each worker node 22 may include one security client 34, or each cluster of applications, or each pod, may include one security client 34. For example, the processing machinery 20 may be configured to instantiate the security clients 34 on the worker nodes 22 so that each Kubernetes pod is protected by a different security client 34. The security clients 34 are described in more detail with reference to FIG. 3.

The following is an overview of the improved distributed security of the distributed security system 10. The security clients 34 monitor traffic and report malicious traffic to the security gateway agent 32. The malicious traffic may be associated with a Denial-of-Service attack or any other attack for which the security clients 34 are configured to monitor and detect. The security gateway agent 32 analyzes data 46 received from any security client 34 and may identify which domain ingress node 16 received and forwarded the malicious traffic. The security gateway agent 32 sends data 48 including data about the identified domain ingress node 16 to a security server 36 to compute one or more security policies 44 to mitigate the malicious traffic. The security server 36 may be external to the domain 12 or may be disposed in the domain 12. The security server 36 is disposed externally to the host computers 14. The security server 36 sends the security policy (or policies) 44 to the domain ingress node 16 (and possibly one or more other domain ingress nodes), and/or to a node external to the domain 12, to enforce the security policy (or policies) 44. The security clients 34 provide data plane security services on the worker nodes 22 that operate in the data plane. The security gateway agent 32 provides control plane security service on the master node 26 that operates in the control plane. The other worker nodes 22 are protected against the malicious traffic as the security policy (or policies) 44 is enforced at the domain ingress node 16 and/or at a node external to the domain 12. The distributed security system 10 provides improved distributed security in a multi-tenant or multi-node environment. The distributed security system 10 also provides an improvement to the processing of the host computer 14 by securing the host computer 14 in a processing-power efficient manner.

In accordance with some embodiments of the present disclosure, the security clients 34, the security gateway agent 32, and the security server 36 implement a Distributed-Denial-of-Service Open Threat Signaling (DOTS) Architecture. In particular, the distribute security system 10 may leverage DOTS architecture and extend DOTS to a dynamic data plane signaled approach where any node along a potential attack path may become a DOTS client to signal additional underlay information that helps to instantiate relevant policies on edge/border nodes such as the domain ingress node 16 in the domain 12 (e.g., a Data Center and/or WAN) to contain attack traffic. It will be appreciated that the security clients 34, the security gateway agent 32, and the security server 36, may be configured to protect against DDoS attacks and/or any other attacks.

Reference is now made to FIG. 2, which is a flow chart 63 including exemplary steps in a first method of operation of the domain ingress node 16 in the system 10 of FIG. 1. Reference is also made to FIG. 1. By way of introduction, the domain ingress node 16 may be a router or any suitable network device. The domain ingress node 16 includes one or more first port interface (not shown) configured to receive (block 64) Internet Protocol (IP) traffic from the domain ingress node 16. The domain ingress node 16 includes a processor (not shown) configured to encapsulate (block 65) each IP packet of the plurality of IP packets (which are not dropped by the domain ingress node 16 as malicious traffic) with an encapsulation header 54. The encapsulation header 54 may be generated in accordance with any suitable method or standard, for example, but not limited to, Segment Routing version 6 (SRv6) standard or Network Service Header (NSH) standard. The encapsulation header 54 includes a source address 56 of the domain ingress node 16 (2000::1 in the example of FIG. 1) and a destination address 58 of a destination of the IP packet (for which the encapsulation header 54 is being generated) (2001:100::1 in the example of FIG. 1) in the domain 12. It should be noted that the source address included in the encapsulation header 54 might be generated such that the source address is indicative of an Internet Service Provider (ISP) or WAN associated with the IP packet, and/or an IP address of the domain ingress node 16. The encapsulation header 54 may include other information 60 such as a segment routing header (SRH) including a segment list and various other typical-length-value (TLV) data. A payload 62 below the encapsulation header 54 is the IP packet for which the encapsulation header 54 is being generated. The IP packet includes an IP header and a data payload. The encapsulation header 54 may include enough information so that the payload 62 may be forwarded to the correct host computer 14, the correct worker node 22 in that host computer 14, and the correct pod 30 in that worker node 22. One or more second port interfaces (not shown) of the domain ingress node 16 are configured to forward (block 66) the IP packets to the host computers 14 in the domain 12 according to the destination address 58 in the encapsulation header 54. In some embodiments, the IP traffic is not encapsulated by the domain ingress node 16.

The host interface 18 is configured to receive the traffic in the encapsulated form. The host interface 18 forwards the traffic to the node virtual forwarder 28, which forwards the traffic to the relevant worker node 22 or master node 26 according to the encapsulation header 54. Within each worker node 22, the traffic is forwarded to the relevant pods 30 according to the encapsulation header 54.

Reference is now made to FIG. 3, which is a flow chart 67 including exemplary steps in a method of operation of the security clients 34 in the system 10 of FIG. 1. Reference is also made to FIG. 1. Each security client 34 is configured to monitor (block 68) at least part of the traffic being forwarded in the worker node 22, in which that security client 34 is instantiated, for malicious traffic. Each security client 34 is configured to identify (block 70) malicious traffic at least based on exchanges of data with the node traffic forwarder 38 and/or the network fabric 40 of the worker node 22, in which that security client 34 is instantiated. The exchanges of data may include communications about the forwarding state and trees on the node traffic forwarder 38 and the network fabric 40 as well as additional data plane metrics. Each security client 34 may also be exchanging data with the node virtual forwarder 28. The exchanges of data are used by each security client 34 to detect an anomaly in the traffic. It should be noted that anomaly detection might include analyzing the encapsulation header 54 with respect to the exchanges of data. The encapsulation header 54 may include a flag, added by the domain ingress node 16 and/or the node virtual forwarder 28, to signal the security client(s) 34 to further analyze the flagged traffic. In accordance with some embodiments anomaly detection does not include deep packet inspection. However, in some embodiments, deep packet inspection may be performed. The malicious traffic may be associated with a Denial-of-Service attack or any other attack for which the security clients 34 are configured to monitor and detect. Each security client 34 is configured to report (block 72) the data item 46 about malicious traffic to the security gateway agent 32. The data item 46 includes data from the encapsulation header 54 (typically the whole encapsulation header 54) of an IP packet of malicious traffic identified by that security client 34, and optionally the payload 62 of that IP packet, the forwarding state, trees, and data plane metrics collected by the security client 34 about the malicious traffic. It should be noted that security clients 34 generally do not enforce the security policies to mitigate malicious traffic. However, in some embodiments the security clients 34 may be configured to enforce security policies to mitigate malicious traffic.

Reference is now made to FIG. 4, which is a flow chart 74 including exemplary steps in a method of operation of a security gateway agent 32 in the system 10 of FIG. 1. Reference is also made to FIG. 1. The security gateway agent 32 is configured to instantiate and monitor, each security client 34 and scale-up and scale-down the number of active security clients 32 according to the number of active worker nodes 22 and/or the number of active pods 30 (or clusters of software applications) depending on the whether the security clients 34 are instantiated per node 22 or per pod 30 (or per cluster). The security gateway agent 32 is configured to receive (block 76) the data item 46 about the malicious traffic from the security client 34 reporting the malicious traffic. The security gateway agent 32 may optionally instruct the node virtual forwarder 28 to replicate traffic with the same or similar encapsulation header 54 to the security gateway agent 32 for further inspection. The security gateway agent 32 may optionally instantiate policies to mitigate malicious traffic in the node virtual forwarder 28 based on the received data item 46. The security gateway agent 32 is configured to determine (block 78) the IP address of the domain ingress node 16 (and/or other relevant node external to the domain 12) from the data item 46, for example, based on the source address 56 or the SRH included in the encapsulation header 54, which is included in the data item 46. The security gateway agent 32 is configured to include (block 80) the IP address of the domain ingress node 16 (and/or other relevant node) in the data item 48. The data item 48 may also include other metrics and data collected by the security client 34 such as the encapsulation header 54, the payload 62 of the malicious traffic, forwarding state, trees and other data plane metrics. In accordance with an alternative embodiment, especially when the security server 36 is disposed in the domain 12, the IP address of the domain ingress node 16 (and/or other relevant nodes) may be determined by the security server 36 based on the encapsulation header 54. The security gateway agent 32 is operative to forward (block 82) the data item 48 about the malicious traffic to the security server 36 for the security server 36 to determine the security policy (or policies) 44, to mitigate the malicious traffic, and to be enforced by one or more domain ingress nodes external to the host computers 14, and/or by a node(s) external to the domain 12.

Figure 5:
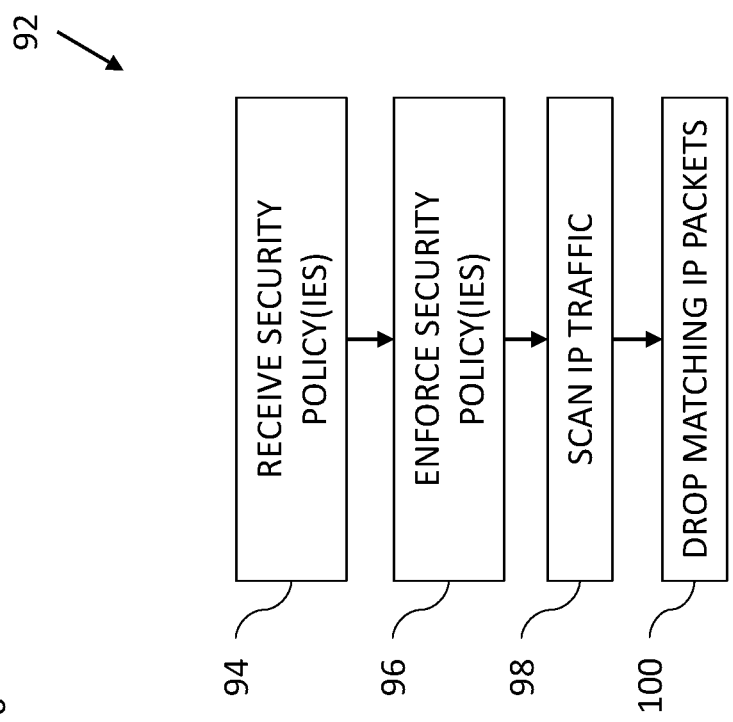
FIG. 5 is a flow chart including exemplary steps in a method of operation of a security server in the system of FIG. 1.

Reference is now made to FIG. 5, which is a flow chart 84 including exemplary steps in a method of operation of the security server 36 in the system 10 of FIG. 1. Reference is also made to FIG. 1. The security server 36 includes an interface (not shown) to receive (block 86) the data item 48 from the security gateway agent 32. The security server 36 includes a processor (not shown) to compute (block 88) the security policy (or policies) 44 to mitigate the malicious traffic. The security policy (or policies) 44 may be based on one or more of the following: data of an IP packet of the malicious traffic (e.g., the payload 62); the encapsulation header 54; other information included in the data 48; and/or other information, for example, but not limited to, information about other threats from the same source of that IP packet, and/or information about other similar malicious traffic. The security policy (or policies) 44 may include one or more of the following: an access control list (ACL); a deep packet inspection (DPI) rule; and/or a signature match, by way of example only. The processor is operative to generate a message including the security policy (or policies) 44, and send (block 90) the message including the security policy (or policies) 44 to the domain ingress node 16 and/or other domain ingress node(s) and/or node(s) external to the domain to enforce the security policy (or policies) 44. The selection of the node or nodes to which to send the policy or policies may be based on an analysis performed by the security server 36 regarding which domain ingress nodes and/or nodes external to the domain 12 could mitigate the security risk of the malicious traffic. By way of example, the security server 36 may be configured to detect an upstream Internet Service Provider (ISP) or WAN, associated with the malicious traffic, from the source address 56 of the encapsulation header 54 or from header information of the IP packet, by way of example only. The data about the ISP or WAN may then be used by the security server 36 to select a node or nodes, external to the domain 12, on which to enforce the security policy (or policies) 44. It should be noted that the policy 44 pushed to the domain ingress node 16 may be different from, or the same as, the policy 44 pushed to a node external to the domain 12.

Figure 6:
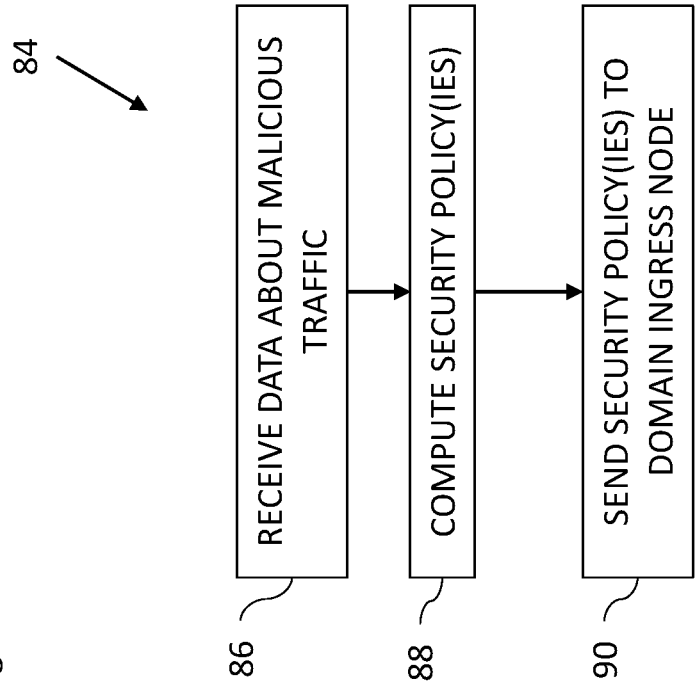
FIG. 6 is a flow chart including exemplary steps in a second method of operation of the domain ingress node in the system of FIG. 1.

Reference is now made to FIG. 6, which is a flow chart 92 including exemplary steps in a second method of operation of the domain ingress node 16 in the system of FIG. 1. Reference is also made to FIG. 1. The processor (not shown) of the domain ingress node 16 is configured to receive (block 94) the security policy (or policies) 44, from the security server 36 (which is typically external to the domain ingress node 16), in order to mitigate the malicious traffic identified in one or more of the host computers 14. The processor of the domain ingress node 16 is configured to enforce (block 96) the security policy (or policies) 44 for the IP traffic received by the first port interface(s) (not shown) of the domain ingress node 16. The processor of the domain ingress node 16 is configured to scan (block 98) the IP traffic for a match with the security policy (or policies) 44 yielding a plurality of matching IP packets, if there is a match or there are matches. The processor of the domain ingress node 16 is configured to drop (block 100) the plurality of matching IP packets without forwarding the plurality of IP packets to the domain 12.

In practice, some or all of the functions of each processor or processing machinery described above may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising a first host computer including:
 a host interface configured to receive traffic from a first domain ingress node of a first domain; and
 processing machinery configured to:
  instantiate a plurality of worker nodes, each one worker node of the plurality of worker nodes including a plurality of software applications;
  instantiate a master node and a security gateway agent on the master node; and
  instantiate a plurality of security clients on the plurality of worker nodes, wherein each one worker node of the plurality of worker nodes includes at least one security client of the plurality of security clients,
 wherein each one security client of the plurality of security clients is configured to: monitor at least part of the traffic being forwarded in the one worker node in which the one security client is instantiated for malicious traffic; and report a first data item about the malicious traffic to the security gateway agent, and
 wherein the security gateway agent is configured to receive the first data item about the malicious traffic from the one security client and forward a second data item about the malicious traffic to a security server, external to the first host computer, for the security server to determine at least one security policy, to mitigate the malicious traffic, and to be enforced by at least one domain ingress node external to the host computer and/or by a node external to the first domain.

2. The system according to claim 1, wherein the malicious traffic is associated with a Denial-of-Service attack.

3. The system according to claim 1, wherein each one worker node of the plurality of worker nodes includes a virtual interface, a node traffic forwarder, and a network fabric, and wherein the processing machinery is configured to instantiate a node virtual forwarder to receive the traffic from the host interface for forwarding to the plurality of worker nodes, and wherein the one security client is configured to identify the malicious traffic at least based on exchanges of data with the node traffic forwarder and/or the network fabric of the one worker node.

4. The system according to claim 1, wherein the one security client does not enforce the at least one security policy to mitigate the malicious traffic.

5. The system according to claim 1, wherein:
the host interface is configured to receive the traffic in an encapsulated form wherein the traffic includes a plurality of Internet Protocol (IP) packets, each one IP packet of the plurality of IP packets being encapsulated with an encapsulation header including a source address of the first domain ingress node and a destination address of a destination of the one IP packet in the first host computer;
the first data item about the malicious traffic includes data from the encapsulation header of an IP packet of the malicious traffic; and
the second data item about the malicious traffic includes an address of the first domain ingress node.

6. The system according to claim 5, wherein the security gateway agent is configured to:
determine the address of the first domain ingress node from the first data item; and
include the address of the first domain ingress node in the second data item.

7. The system according to claim 5, wherein the security gateway agent is configured to:
instantiate and monitor each one security client of the plurality of security clients; and
scale-up and scale-down the plurality of security clients.

8. The system according to claim 1, wherein the plurality of security clients, the security gateway agent and the security server together implement a Distributed-Denial-of-Service Open Threat Signaling (DOTS) Architecture.

9. The system according to claim 1, wherein the plurality of software applications are containerized in a plurality of containers, each one container of the plurality of containers including at least one software application of the plurality of software applications.

10. The system according to claim 9, wherein the plurality of containers are encapsulated in a plurality of Kubernetes pods, each one Kubernetes pod of the plurality of Kubernetes pods including at least one container of the plurality of containers.

11. The system according to claim 10, wherein the processing machinery is configured to instantiate the plurality of security clients on the plurality of worker nodes so that each one Kubernetes pod of the plurality of Kubernetes pods is protected by a different security client of the plurality of security clients.

12. The system according to claim 1, further comprising the first domain ingress node and a plurality of host computers.

13. The system according to claim 1, further comprising the first domain ingress node including:
at least one first port interface configured to receive Internet Protocol (IP) traffic from sources external to the first domain, the IP traffic including a plurality of IP packets;
a processor configured to encapsulate each one IP packet of the plurality of IP packets with an encapsulation header including a source address of the first domain ingress node and a destination address of a destination of the one IP packet in the first domain; and
at least one second port interface configured to forward the plurality of IP packets to a plurality of host computers in the first domain, wherein the processor is further configured to:
receive the at least one security policy, from the security server, which is external to the first domain ingress node, to mitigate the malicious traffic identified in at least one of the plurality of host computers; and
enforce the at least one security policy for the IP traffic received by the at least one first port interface.

14. The system according to claim 13, wherein the processor is further configured to:
scan the IP traffic for a match with the at least one security policy yielding a plurality of matching IP packets; and
drop the plurality of matching IP packets without forwarding the plurality of IP packets to the first domain.

15. A domain ingress node device, comprising:
at least one first port interface configured to receive Internet Protocol (IP) traffic from sources external to a first domain, the IP traffic including a plurality of IP packets;
a processor configured to encapsulate each one IP packet of the plurality of IP packets with an encapsulation header including a source address of the domain ingress node and a destination address of a destination of the one IP packet in the first domain; and
at least one second port interface configured to forward the plurality of IP packets to a plurality of host computers in the first domain, wherein the processor is further configured to:
receive at least one security policy, from a security server external to the domain ingress node, to mitigate malicious traffic identified in at least one of the plurality of host computers; and
enforce the at least one security policy for the IP traffic received by the at least one first port interface.

16. The device according to claim 15, wherein the processor is further configured to:
scan the IP traffic for a match with the at least one security policy yielding a plurality of matching IP packets; and
drop the plurality of matching IP packets without forwarding the plurality of IP packets to the first domain.

17. A security server device, comprising:
an interface configured to receive a data item about malicious traffic from a security gateway agent instantiated on a host computer of a first domain;
a processor configured to:
compute at least one security policy to mitigate the malicious traffic; and
send the at least one security policy to a domain ingress node external to the host computer, and/or by a node external to the first domain, to enforce the at least one security policy.

18. The device according to claim 17, wherein the data item about the malicious traffic includes data from an encapsulation header of an IP packet of the malicious traffic, the data from the encapsulation header including an address of the domain ingress node.

19. The device according to claim 17, wherein the processor is configured to compute the at least one security policy to mitigate the traffic at least based on data of an IP packet of the malicious traffic.

20. The device according to claim 17, wherein the security server device is configured to form part of a Distributed-Denial-of-Service Open Threat Signaling (DOTS) Architecture.

* * * * *